United States Patent [19]

Zinck

[11] Patent Number: 5,402,626

[45] Date of Patent: Apr. 4, 1995

[54] LAWN MOWER

[76] Inventor: Wolf D. Zinck, 6534 Stromberger, Neuhutte 5, Germany

[21] Appl. No.: 974,426

[22] Filed: Nov. 12, 1992

[30] Foreign Application Priority Data

Nov. 12, 1991 [DE] Germany .................. 41 37 162.3

[51] Int. Cl.$^6$ ............................................. A01D 34/78
[52] U.S. Cl. ...................................... 56/11.9; 56/16.7; 56/DIG. 9
[58] Field of Search ................. 56/11.9, 16.7, DIG. 9

[56] References Cited

U.S. PATENT DOCUMENTS

| | | | |
|---|---|---|---|
| 3,581,480 | 6/1971 | O'Conner, III et al. | 56/11.9 |
| 3,676,989 | 7/1972 | Slayton | 56/11.9 X |
| 4,333,302 | 6/1982 | Thomas et al. | 56/11.9 X |
| 4,446,680 | 5/1984 | D'Alessandro | 56/11.9 |
| 4,987,729 | 1/1991 | Paytas | 56/11.9 |

FOREIGN PATENT DOCUMENTS 1073771 6/1967 Germany ..................... 56/11.9

Primary Examiner—Terry Lee Melius
Attorney, Agent, or Firm—Larson & Taylor

[57] ABSTRACT

The invention relates to a lawn mower driven by at least one permanently excited d.c. motor that is supplied with power from a battery on the lawn mower. In order to prevent the lawn mower from being restricted to one surface during mowing and make it easily adaptable to various surfaces and easy to handle, the battery can be quickly and easily electrically disconnected from the lawn mower, removed, and replaced by the operator.

18 Claims, 4 Drawing Sheets

LAWN MOWER

FIELD OF THE INVENTION

The invention relates to a lawn mower driven by at least one permanently excited d.c. motor that is supplied with power from a battery on the lawn mower.

BACKGROUND OF THE INVENTION

Such lawn mowers according to the state of the art have been offered on the market repeatedly in the past and have disappeared from the market again after some time. In these lawn mowers, the battery is a built-in part of the lawn mower and is connected permanently to it by way of cables, attachments, covers, etc. The battery weight is thus part of the lawn mower weight. The lawn mower is therefore significantly heavier than standard lawn mowers with single phase electric motor that are powered via a cable from the power mains. The disadvantage of the greater weight is present especially when transporting the lawn mower, e.g. over steps. The battery capacity of the lawn mower is chosen so that at least a specific grass area that is specified by the manufacturer can be mowed with a single discharge of the battery, and is therefore limited. Hereby it is taken into account that the usable capacity of both a lead and a nickel-cadmium battery decreases through use and aging and that mowing conditions themselves differ. According to manufacturers' statements, standard lawn mowers therefore are only capable of mowing approximately 200 m$^2$ to 300 m$^2$ areas without recharging, in spite of a heavy lead battery with e.g. 40 ampere hours at 12 volts, or in spite of an expensive nickel-cadmium battery with e.g. 7 ampere hours at 24 volts. In the case of such a lawn mower that was recently introduced on the market, the nickel cadmium battery is supposed to be charged within a short time by a quick-charge device, in order to be able to mow under difficult mowing conditions and to be able to mow larger grass areas. But this means an interruption of the mowing for recharging and requires an expensive quick-charge device.

SUMMARY OF THE INVENTION

This invention is therefore based on the task of proposing a reasonably priced lawn mower whose mowing area is not determined by a built-in battery, whose weight, at least at certain times, does not significantly exceed the weight of lawn mowers with a single phase electric motor, and whose mowing of larger areas or under difficult mowing conditions is not interrupted for a long time by charging processes and depends on expensive chargers.

These and other advantages are realized by a lawn mower driven by at least one permanently excited d.c. motor, a battery supplying the motor with power, and means for easily connecting and disconnecting the battery to the motor, such that the battery is easily removed and replaced from the lawn mower by an operator. This disconnection, removal and replacement may be performed without using tools. There may be more than one battery, and these batteries may be located in separate housings or in a mutual housing. The battery and/or its housing may have a handle or other means for easy grasping attached thereto. The lawn mower may include a receptacle or lever fixation for securely attaching the battery. Other objects, features and advantages of the present invention will be apparent from the following detailed description.

BRIEF DESCRIPTION OF THE DRAWINGS

The invention will be described with reference to the accompanying drawings, wherein.

DETAILED DESCRIPTION OF THE PREFERRED EMBODIMENTS

Figure 1:
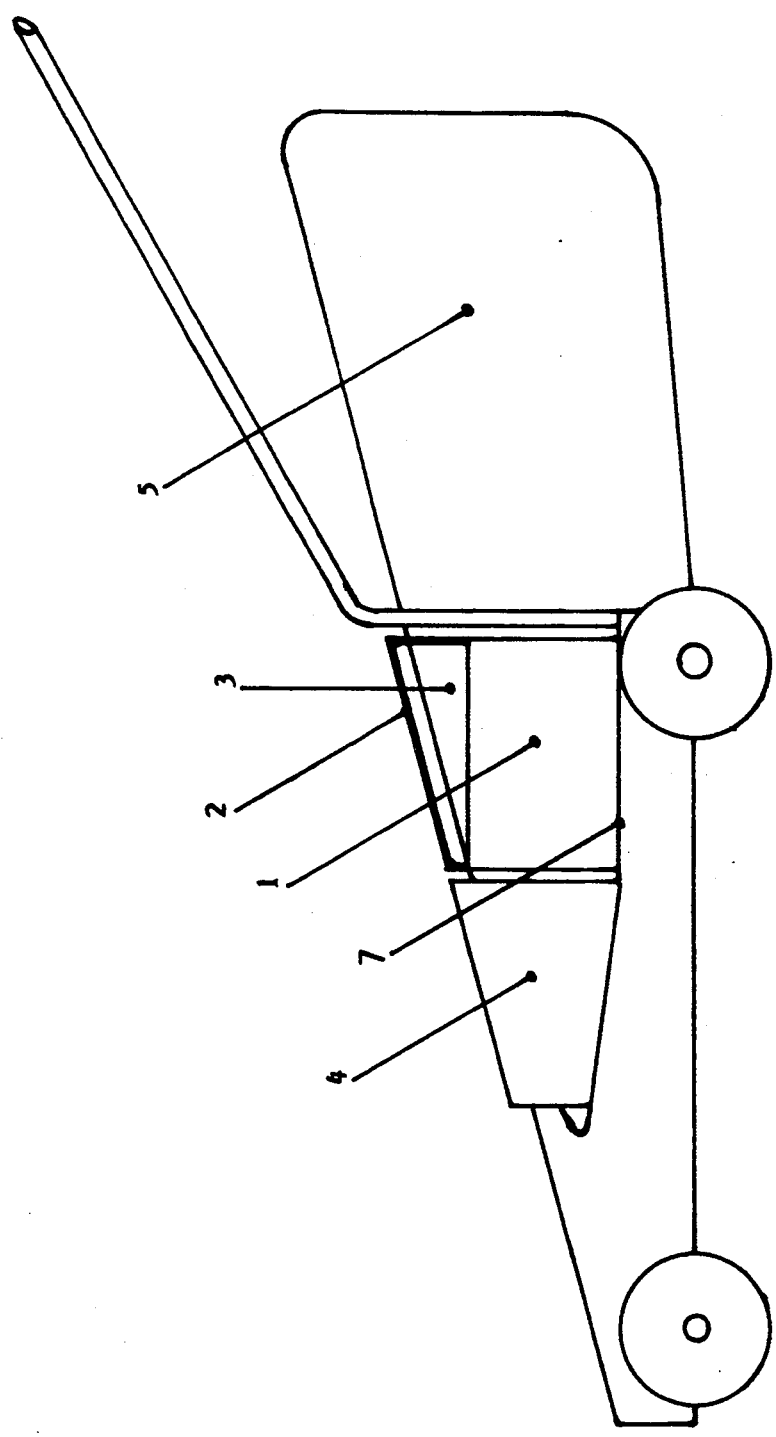
FIG. 1 is a side view of a exemplary lawn mower of the present invention.
Figure 2:
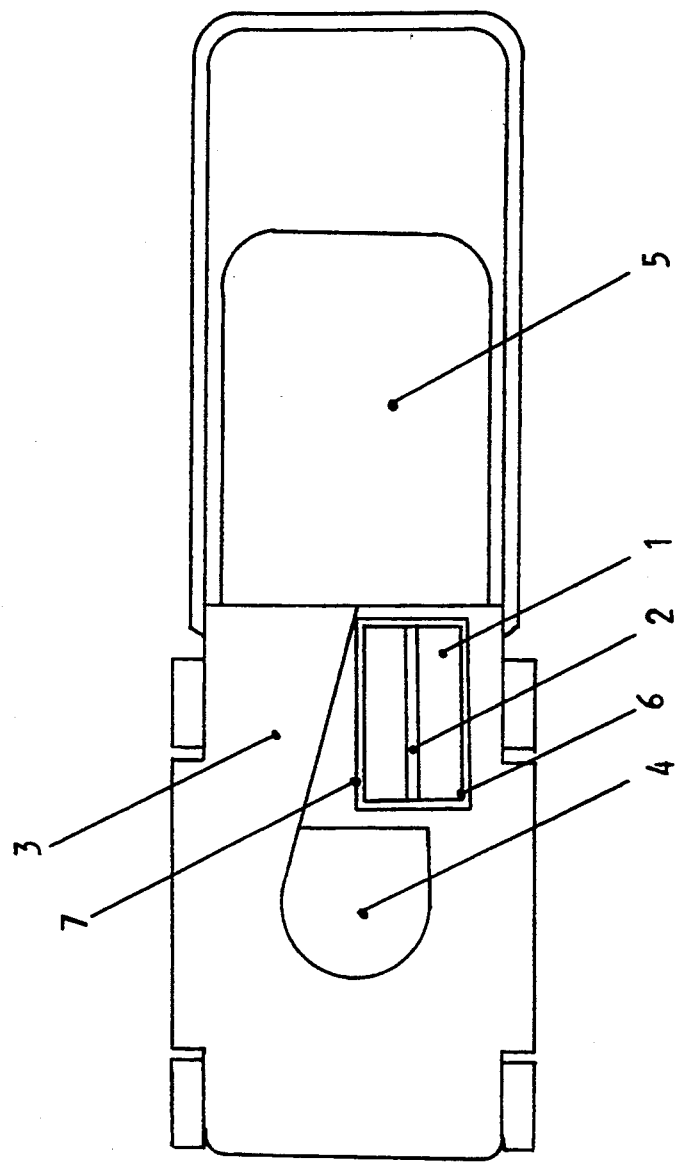
FIG. 2 is a top view of the lawn mower shown in FIG. 1.

FIGS. 1 and 2 show an exemplary embodiment of the present invention used with a manually guided lawn mower having an outer surface 7 whose cutting tool is a scythe blade. A battery 1 is placed between a d.c. motor 4 and a grass catcher container 5, and in front of channel 3 through which cut grass is transported to grass catcher container 5. Advantageously, battery 1 has a handle 2.

As can be seen in the top view of FIG. 2, battery 1 may be encased by an optional housing 6. D.C. motor 4 cannot be seen from the top view, because it is covered by a shroud.

Figure 3A:
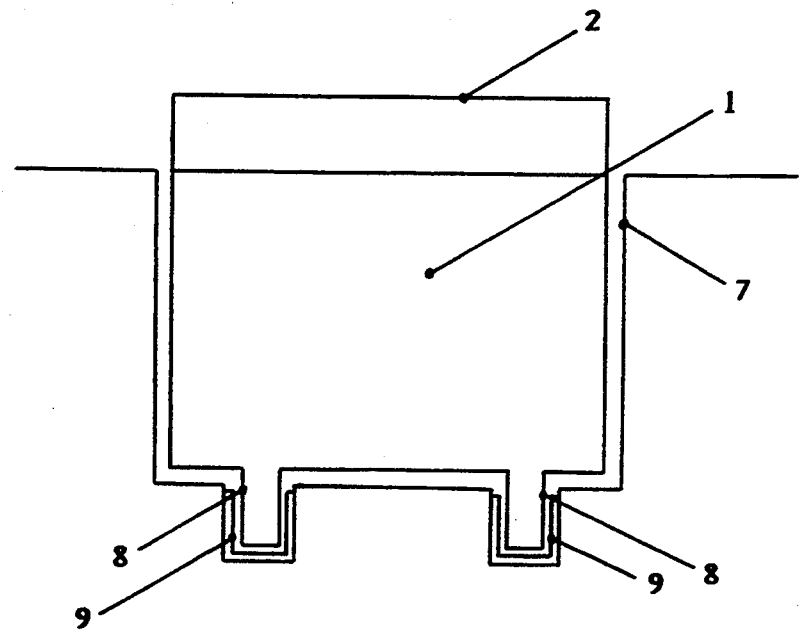
FIG. 3a is a side view of an exemplary easy electrical connection of the present invention via a plug.
Figure 3B:
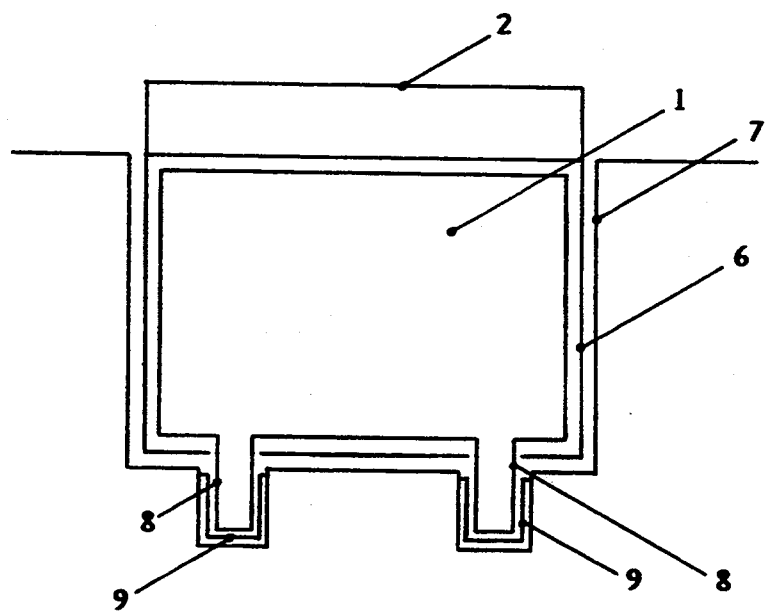
FIG. 3b is a side view of an exemplary easy electrical connection of the present invention via a plug when the battery has a housing.

FIG. 3a is an exemplary embodiment of the present invention in which the electrical connection of battery 1 is achieved using a plug 8 extending from battery 1, plug 8 being received by surface contacts 9 integral with a receptor 7 for battery 1 on the lawn mower. When housing 6 is used, as shown in FIG. 3b, plug 8 extends through housing 6.

Figure 4A:
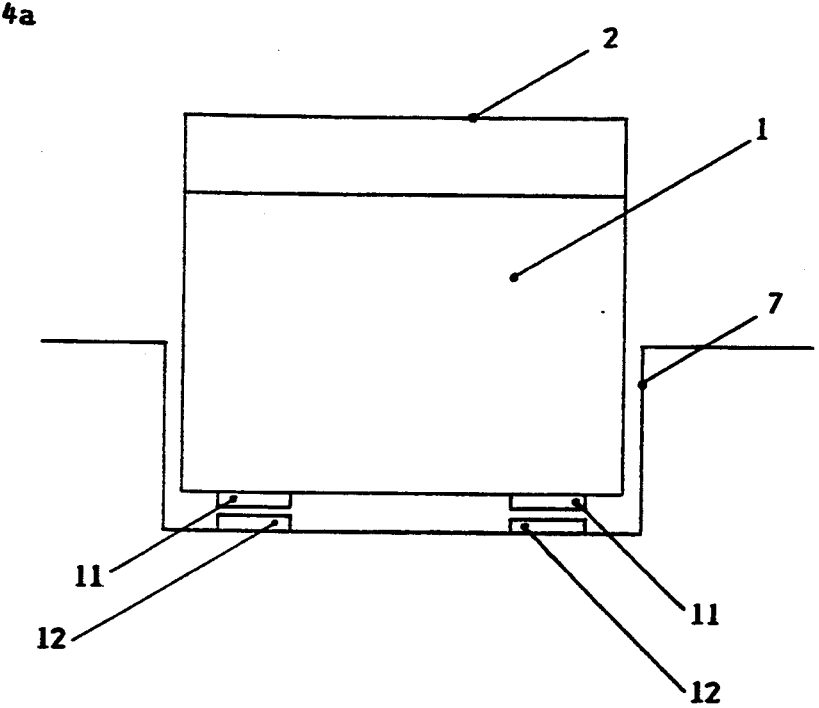
FIG. 4a is a side view of an exemplary easy electrical connection of the present invention via planar surface contacts.
Figure 4B:
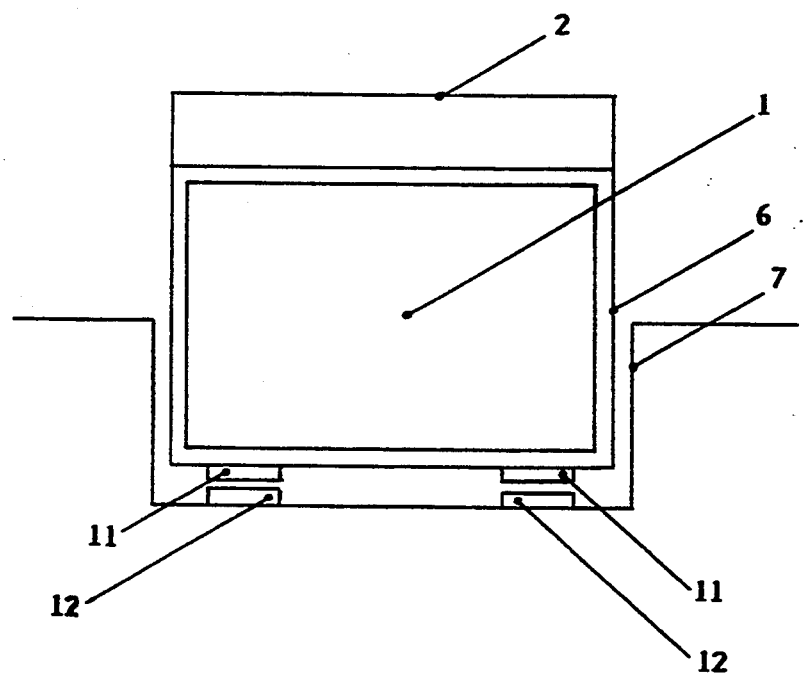
FIG. 4b is a side view of an exemplary easy electrical connection of the present invention via planar surface contacts when the battery has a housing.

FIG. 4a is an exemplary embodiment of the present invention in which the electrical connection of battery 1 is achieved using planar surface contacts 11 on battery 1 in contact with planar surface contacts 12 integral with a receptor 7 for battery 1 on the lawn mower. If housing 6 is employed, as shown in FIG. 4b, planar surface contacts 11 may be located on housing 6.

The lawn mower according to the invention is characterized therefore in that the battery 1, with or without a housing 6 holding the battery, can be quickly and easily electrically disconnected from the lawn mower, removed, and replaced by the operator. The mowing area of the invented lawn mower is therefore optional and can be adapted to the grass area to be mowed in an advantageous manner. It is possible, e.g. during transport over steps or loading into a car, etc., to simply remove the battery from the lawn mower, so that the weight is divided and, taken individually, can be handled with much less physical effort by the operator. Mowing of larger areas or under difficult mowing conditions can be performed without interruptions, except for the brief time required for replacing the battery.

An especially preferred embodiment provides that the battery 1, with or without a housing holding the battery, can be replaced by the operator without using tools. This enables a particularly fast and simple replacement of the battery.

Other embodiments may provide that several batteries, with or without a mutual housing or located in separated housings holding the batteries, can be arranged on the lawn mower simultaneously and that the battery itself and/or the housing holding it has one or several handles and/or handle ridges and/or similar provisions. Due to these characteristics, the weight and volume of the battery, with or without the housing holding the battery, is divided and the operator thus is able to handle it with little physical effort; it also can be attached to the lawn mower in a spatially divided manner and is easily handled.

The battery 1 may be attached to the lawn mower using its own gravity and/or receptacles and/or lever fixation and/or similar provisions, enabling operation without problems. The electrical connection between battery 1, with or without a housing holding the battery, and the lawn mower is made with plug and/or surface contacts and/or similar provisions and enables a quick and simple making and separating of the electrical connection. Different types of batteries and battery capacities can be attached to the lawn mower. This makes it possible to adapt the lawn mower flexibly to different types of usage. Hereby the grass area, grass conditions, physical condition of the operator, usage frequency of the lawn mower, etc. can be taken into account.

Lawn mowers that are guided and pushed by the operator may have a battery capacity of approximately 15 to 45 minutes of average mowing time with a single discharge of the attached battery or batteries; for lawn mowers that are guided by the operator but have their own drive this amounts to approximately 20 to 60 minutes; for lawn mowers that are driven by a person riding on them this amounts approximately 30 to 90 minutes. This allows for a lawn mower that, if it is pushed by an operator, has the smallest possible total weight; that, if it has its own drive, has a total weight that is easily handled and steered by the operator; that, if the operator rides on it, has no unnecessarily high weight of the lawn mower that stresses the lawn. The respective higher operating time range is accomplished preferably with powerful, relatively light high-performance batteries, e.g. nickel-cadmium batteries.

It is advantageous that the battery itself or a housing holding the battery are in part or in their entirety part of the exterior form of the lawn mower. This eliminates the need for additional covers, simplifies handling, and reduces cost.

Lawn mowers according to the invention can also be characterized in that the lawn mower is manually guided and pushed or motor-driven by an operator walking behind it, or is driven by an operator riding on it, whereby the cut grass is placed into a collection device or placed onto the grass surface or is mulched and introduced into the grass surface. In addition, the cutting tool can rotate about an axis that is vertical or horizontal to the grass surface or moves back and forth or circulates parallel to the grass surface. According to the invention, the battery, with or without a housing holding the battery, can be arranged at any place on the lawn mower.

I claim:

1. A lawn mower comprising:
   a permanently excited d.c. motor;
   a removable battery for supplying power to said motor; and
   means for easily electrically connecting and disconnecting said battery and motor by an operator of said lawn mower such that said battery is easily removed and replaced from said lawn mower by an operator of said lawn mower, said means for easily electrically connecting and disconnecting comprising surface contacts integral with a receptor for said battery on said lawn mower, wherein just removal of the battery from said receptor discontinues electrical contact and wherein just placement of the battery on to said receptor establishes electrical contact.

2. A lawn mower as recited in claim 1, further comprising a housing holding said battery.

3. The lawn mower as recited in claim 2, further comprising additional batteries simultaneously located in said housing.

4. The lawn mower as recited in claim 1, further comprising additional batteries simultaneously located in separate housings in said lawn mower.

5. The lawn mower as recited in claim 1, wherein said battery includes a handle.

6. The lawn mower as recited in claim 2, wherein said housing includes a handle.

7. The lawn mower as recited in claim 1, including a receptacle for securely attaching said battery to said lawn mower.

8. The lawn mower as recited in claim 1, including a lever fixation for securely attaching said battery to said lawn mower.

9. The lawn mower as recited in claim 1, wherein said means for electrically connecting said battery and said motor further comprises a plug integral with and extending from said battery and received by said surface contacts integral with said receptor for said battery on said lawn mower.

10. The lawn mower as recited in claim 1, wherein said battery is at least partially part of the exterior form of said lawn mower.

11. The lawn mower as recited in claim 2, wherein said battery housing is at least partially part of the exterior form of said lawn mower.

12. The lawn mower according to claim 1, including a type of battery which can be altered for varying operating conditions.

13. The lawn mower as recited in claim 1, wherein said means for connecting and disconnecting does not require use of tools.

14. A lawn mower as recited in claim 1, wherein said means for easy electrically connecting and disconnecting said battery further comprises planar surface contacts on said battery, said planar surface contacts being contacted by said surface contacts with said receptor for said battery on said lawn mower.

15. A lawn mower as recited in claim 1, further comprising additional batteries simultaneously located on said lawn mower.

16. A lawn mower as recited in claim 15, further comprising additional surface contacts integral with said receptor for said battery on said lawn mower for easily connecting and disconnecting said additional batteries.

17. A lawn mower as recited in claim 2, wherein said means for electrically connecting and disconnecting said battery further comprises planar surface contacts on said housing, said battery being electrically connected to said planar surface contacts and said planar surface contacts being contacted by said surface contacts integral with said receptor for said battery on said lawn mower.

18. A lawn mower as recited in claim 2, wherein said means for electrically connecting and disconnecting said battery further comprises a plug extending from said battery through said housing and being received by said surface contacts integral with said receptor for said battery on said lawn mower.

* * * * *